(12) United States Patent
Chung et al.

(10) Patent No.: US 9,020,123 B2
(45) Date of Patent: Apr. 28, 2015

(54) APPARATUS AND METHOD FOR MANAGING PRIORITY COMMUNICATION

(75) Inventors: Li-Jin Chung, Lincroft, NJ (US);
Yu-Lein Kung, Holmdel, NJ (US);
Jeffrey Stein, Cliffwood, NJ (US);
Ching-Chyuan Shieh, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1399 days.

(21) Appl. No.: 12/198,722

(22) Filed: Aug. 26, 2008

(65) Prior Publication Data

US 2010/0054437 A1  Mar. 4, 2010

(51) Int. Cl.
*H04M 3/42* (2006.01)
*H04M 15/06* (2006.01)
*H04M 15/00* (2006.01)
*H04W 76/00* (2009.01)
*H04M 7/00* (2006.01)

(52) U.S. Cl.
CPC .............. *H04M 15/06* (2013.01); *H04M 7/006* (2013.01); *H04M 15/41* (2013.01); *H04M 15/56* (2013.01); *H04M 15/85* (2013.01); *H04M 15/851* (2013.01); *H04M 2215/0164* (2013.01); *H04M 2215/202* (2013.01); *H04M 2215/815* (2013.01); *H04M 2242/04* (2013.01); *H04W 76/007* (2013.01)

(58) Field of Classification Search
USPC ........ 379/210.02–210.03, 9.03, 188; 455/405
See application file for complete search history.

(56) References Cited

U.S. PATENT DOCUMENTS

| | | | |
|---|---|---|---|
| 5,907,800 A * | 5/1999 | Johnson et al. | 455/405 |
| 6,757,357 B1 * | 6/2004 | Horton et al. | 379/9.03 |
| 6,920,209 B1 * | 7/2005 | Gainsboro | 379/188 |
| 7,231,029 B1 * | 6/2007 | Kirkpatrick | 379/210.02 |
| 2003/0169870 A1 * | 9/2003 | Stanford | 379/265.12 |
| 2006/0133582 A1 | 6/2006 | Mc Culloch | |
| 2007/0165821 A1 * | 7/2007 | Altberg et al. | 379/210.02 |
| 2008/0090546 A1 | 4/2008 | Dickinson et al. | |
| 2008/0090547 A1 | 4/2008 | Struhsaker | |
| 2011/0267986 A1 * | 11/2011 | Grabelsky et al. | 370/259 |

* cited by examiner

*Primary Examiner* — Md S Elahee
(74) *Attorney, Agent, or Firm* — Hanley, Flight & Zimmerman, LLC

(57) ABSTRACT

A system that incorporates teachings of the present disclosure may include, for example, a server having a controller to obtain billing data associated with a plurality of calls over a Voice Over Internet Protocol network, determine special service calls being made based on the billing data, monitor for the special service calls being associated with at least one of one calling number or one network node, and determine an undesired condition based at least in part on the special service calls being made from the one calling number or through the one network node exceeding a threshold. Other embodiments are disclosed.

24 Claims, 8 Drawing Sheets

200

600

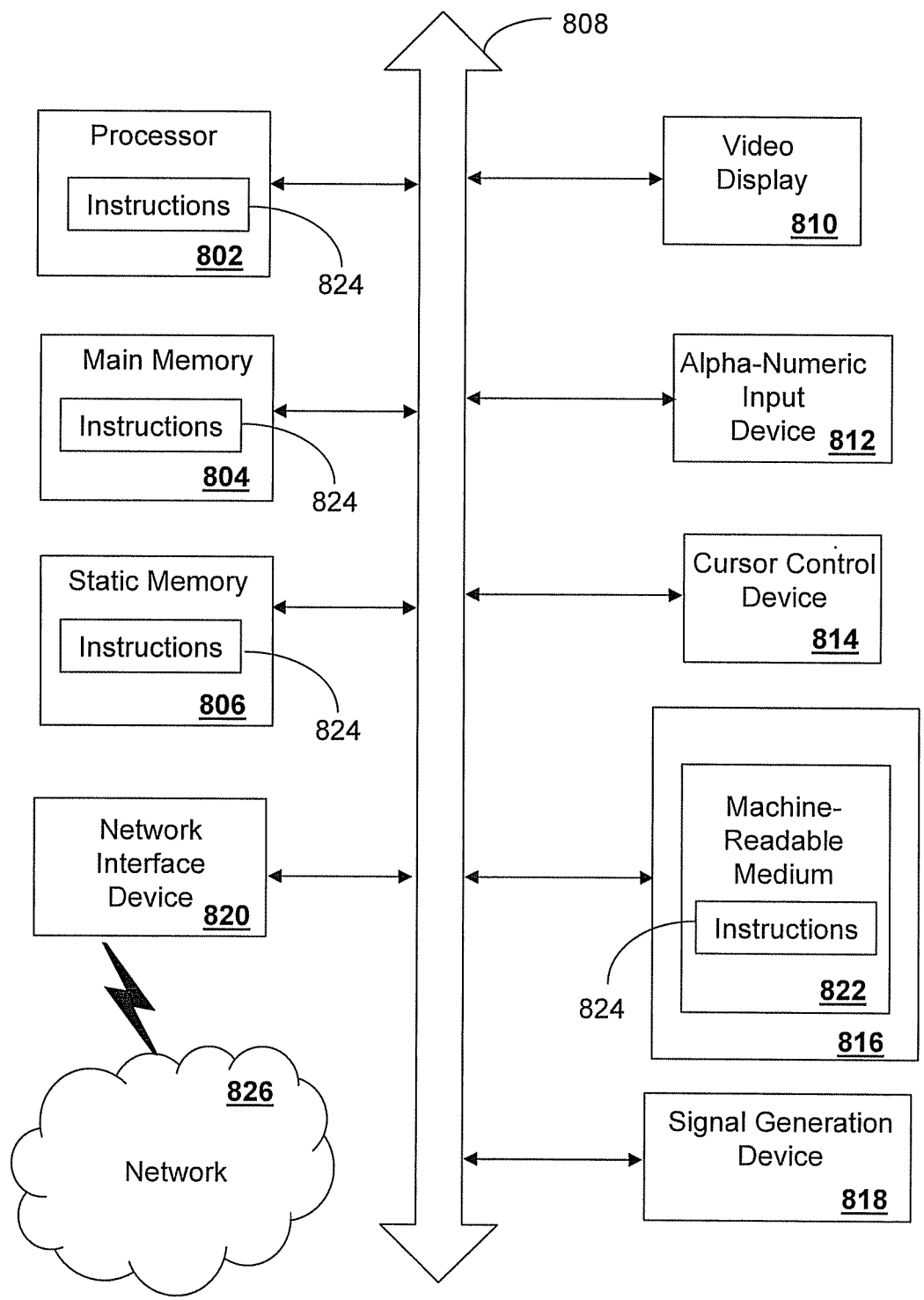
FIG. 8    800

US 9,020,123 B2

APPARATUS AND METHOD FOR MANAGING PRIORITY COMMUNICATION

FIELD OF THE DISCLOSURE

The present disclosure relates generally to network communication and more specifically to an apparatus and method for managing priority communication.

BACKGROUND

Various architectures and protocols are available for providing voice communications between parties, such as Public Switched Telephone networks, Public Land Mobile networks, and Voice over Internet Protocol (VoIP) networks. Similar to other networks, VoIP networks handle calls between various parties, including special service calls (e.g., 911 calls). Users expect a certain level of reliability for special service calls.

BRIEF DESCRIPTION OF THE DRAWINGS

FIG. 8 is a diagrammatic representation of a machine in the form of a computer system within which a set of instructions, when executed, may cause the machine to perform any one or more of the methodologies discussed herein.

DETAILED DESCRIPTION

One embodiment of the present disclosure entails computer-readable storage medium, having computer instructions for obtaining billing data associated with a plurality of calls over a Voice Over Internet Protocol network, determining whether a portion of the plurality of calls are to a special service number based on the billing data, monitoring the portion of the plurality of calls for an undesired condition based at least in part on the portion of the plurality of calls being from one calling number or the portion of the calls being from one geographic region, and presenting an alert when the undesired condition is detected.

Another embodiment of the present disclosure entails a server having a controller to obtain call records associated with a plurality of calls over a Voice Over Internet Protocol network, determine special service calls being made based on the call records, monitor for the special service calls being made from one calling number, and determine an undesired condition based at least in part on the special service calls being made from the one calling number exceeding a threshold.

Yet another embodiment of the present disclosure entails a server having a controller to obtain call records associated with a plurality of calls over a Voice Over Internet Protocol network, determine special service calls being made based on the call records, monitor for the special service calls being made through one network node, and determine an undesired condition based at least in part on the special service calls being made through the one network node exceeding a threshold.

Yet another embodiment of the present disclosure entails a server having a controller to obtain billing data associated with a plurality of calls over a Voice Over Internet Protocol network, determine special service calls being made based on the billing data, monitor for the special service calls being associated with at least one of one calling number or one network node, and determine an undesired condition based at least in part on the special service calls being made from the one calling number or through the one network node exceeding a threshold.

Yet another embodiment of the present disclosure entails a method including obtaining billing data associated with a plurality of calls over a Voice Over Internet Protocol network, determining whether a portion of the plurality of calls are to a special service number based on the billing data, and monitoring the portion of the plurality of calls for an undesired condition based on the portion of the plurality of calls being from one calling number or the portion of the calls being through one network node.

Figure 1:
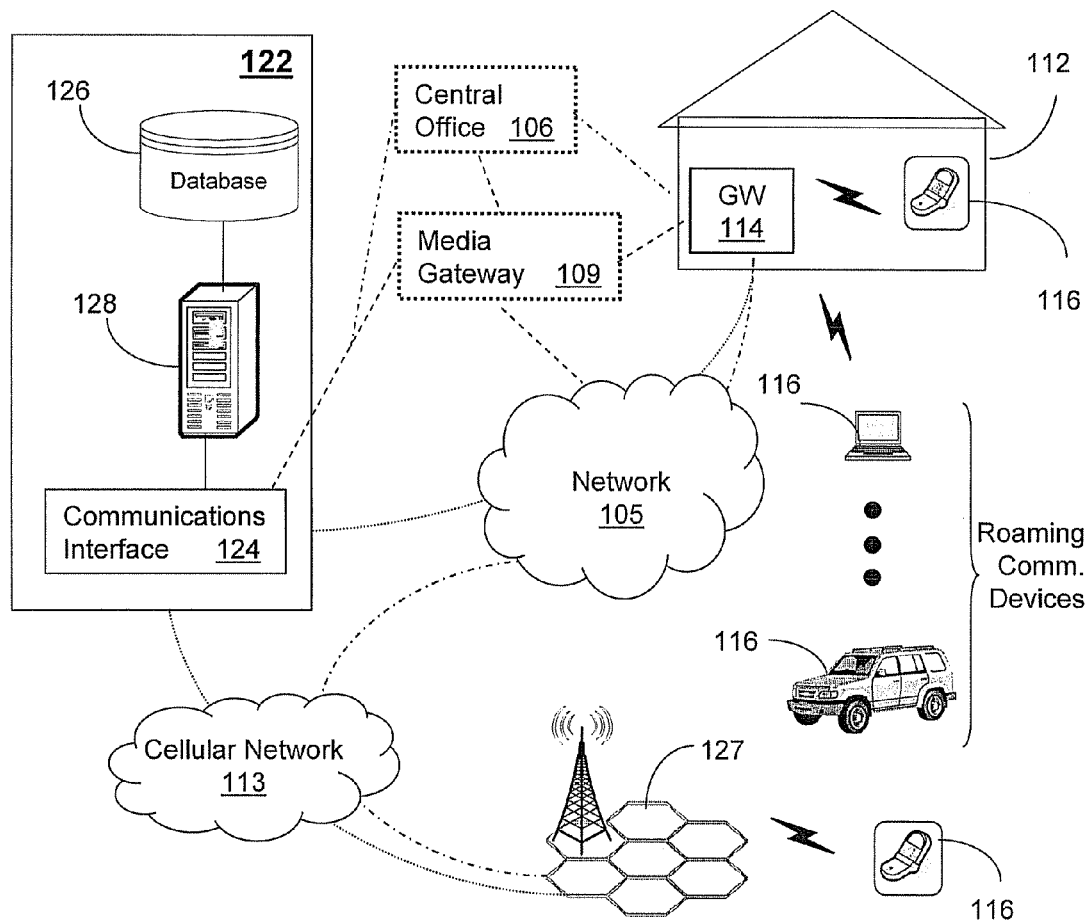
FIGS. 1-3 depict illustrative embodiments of communication systems that provide media services.

FIG. 1 depicts an exemplary embodiment of a communication device 116 communicating by way of wired and/or wireless access points (WAPs) with other communication devices and/or a network proxy or web server 122 which collectively operate in a communication system 100. The communication device 116 can be a multimode VoIP terminal. However, the present disclosure contemplates the use of other types of communication devices, including other types of voice, video and data devices. The communication system 100 can comprise a packet-switched network 105. The packet-switched network can be an Internet Service Provider (ISP) network 105. The network 105 can be coupled to the network proxy 122, the cellular network 113 and network elements located in one or more of the buildings 112 representing an enterprise or residence. The ISP network 105 utilizes technology for transporting Internet traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

Figure 2:
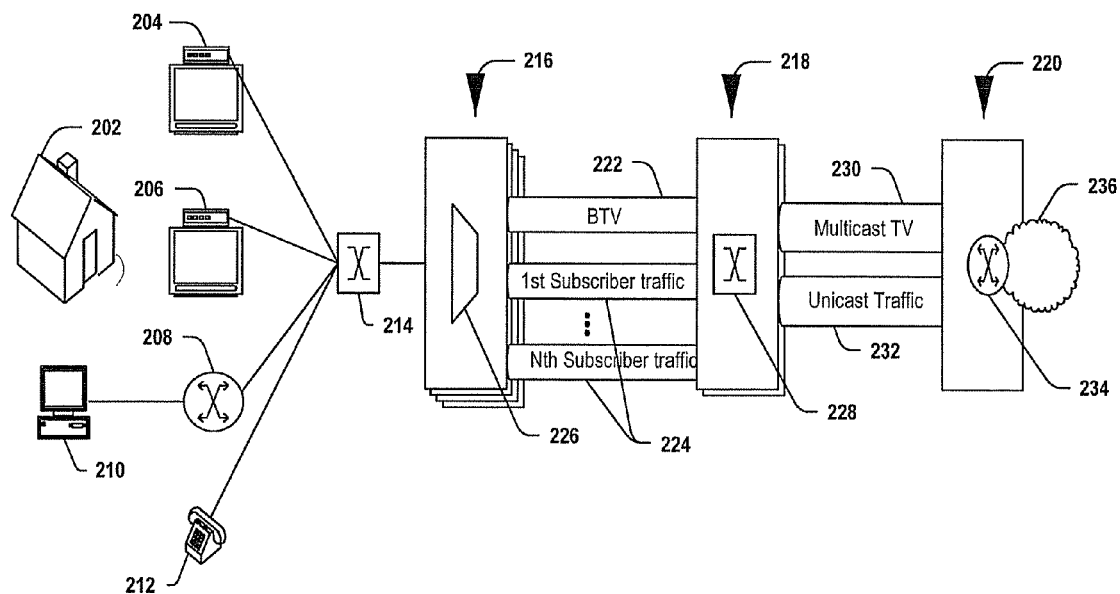

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remote control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
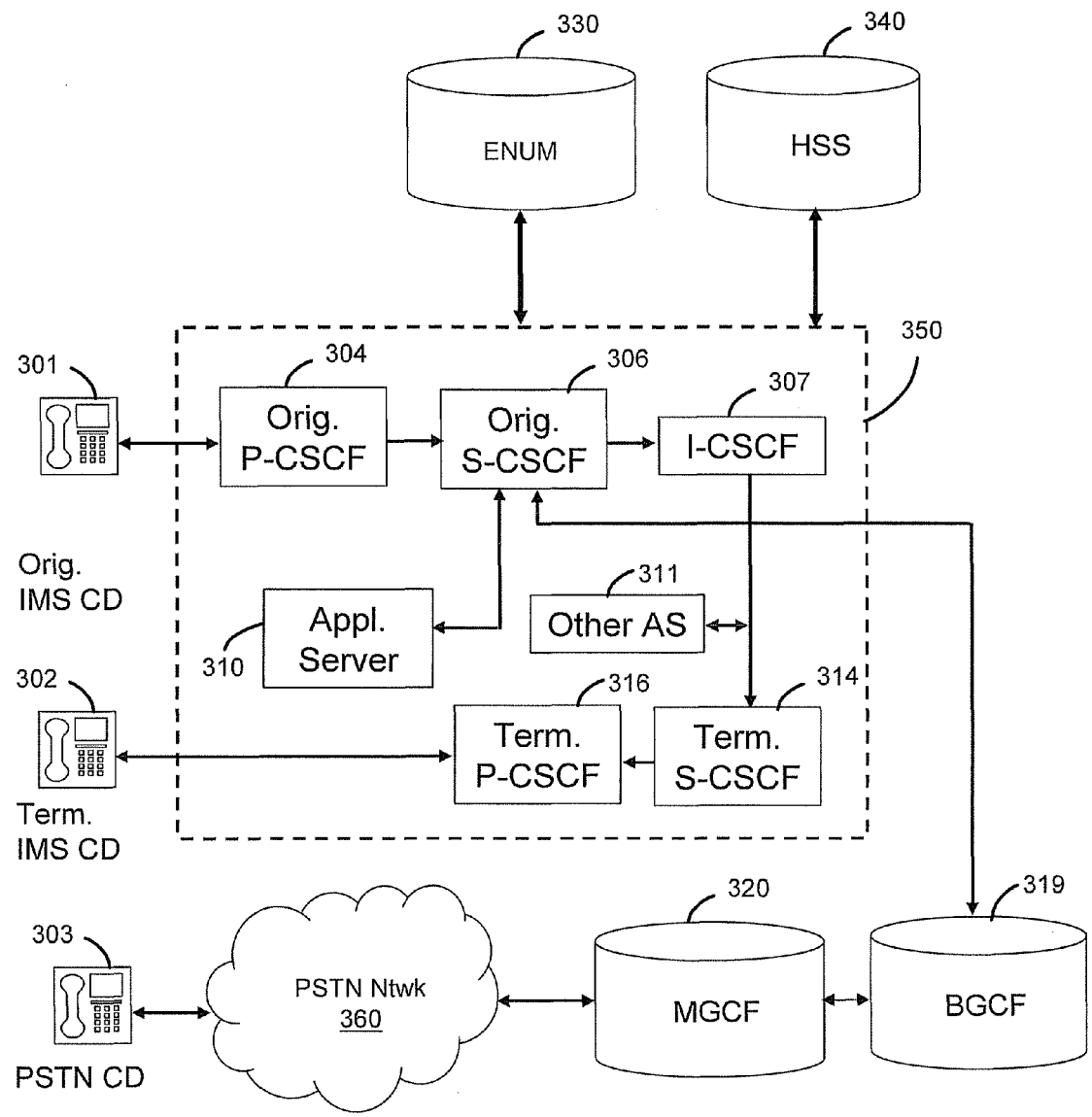

FIG. 3 depicts an illustrative embodiment of a communication system 300 employing an IP Multimedia Subsystem (IMS) network architecture. Communication system 300 can be overlaid or operably coupled with communication systems 100-200 as another representative embodiment of said communication systems.

The communication system 300 can comprise a Home Subscriber Server (HSS) 340, a tElephone NUmber Mapping (ENUM) server 330, and network elements of an IMS network 350. The IMS network 350 can be coupled to IMS compliant communication devices (CD) 301, 302 or a Public Switched Telephone Network (PSTN) CD 303 using a Media Gateway Control Function (MGCF) 320 that connects the call through a common PSTN network 360.

IMS CDs 301, 302 register with the IMS network 350 by contacting a Proxy Call Session Control Function (P-CSCF) which communicates with a corresponding Serving CSCF (S-CSCF) to register the CDs with an Authentication, Authorization and Accounting (AAA) supported by the HSS 340. To accomplish a communication session between CDs, an originating IMS CD 301 can submit a Session Initiation Protocol (SIP INVITE) message to an originating P-CSCF 304 which communicates with a corresponding originating S-CSCF 306. The originating S-CSCF 306 can submit the SIP INVITE message to an application server (AS) such as reference 310 that can provide a variety of services to IMS subscribers. For example, the application server 310 can be used to perform originating treatment functions on the calling party number received by the originating S-CSCF 306 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 306 can submit queries to the ENUM system 330 to translate an E.164 telephone number to a SIP Uniform Resource Identifier (URI) if the targeted communication device is IMS compliant. If the targeted communication device is a PSTN device, the ENUM system 330 will respond with an unsuccessful address resolution and the S-CSCF 306 will forward the call to the MGCF 320 via a Breakout Gateway Control Function (BGCF) 319.

When the ENUM server 330 returns a SIP URI, the SIP URI is used by an Interrogating CSCF (I-CSCF) 307 to submit a query to the HSS 340 to identify a terminating S-CSCF 314 associated with a terminating IMS CD such as reference 302. Once identified, the I-CSCF 307 can submit the SIP INVITE to the terminating S-CSCF 314 which can call on an application server 311 similar to reference 310 to perform the originating treatment telephony functions described earlier. The terminating S-CSCF 314 can then identify a terminating P-CSCF 316 associated with the terminating CD 302. The P-CSCF 316 then signals the CD 302 to establish communications. The aforementioned process is symmetrical. Accordingly, the terms "originating" and "terminating" in FIG. 3 can be interchanged.

Figure 4:
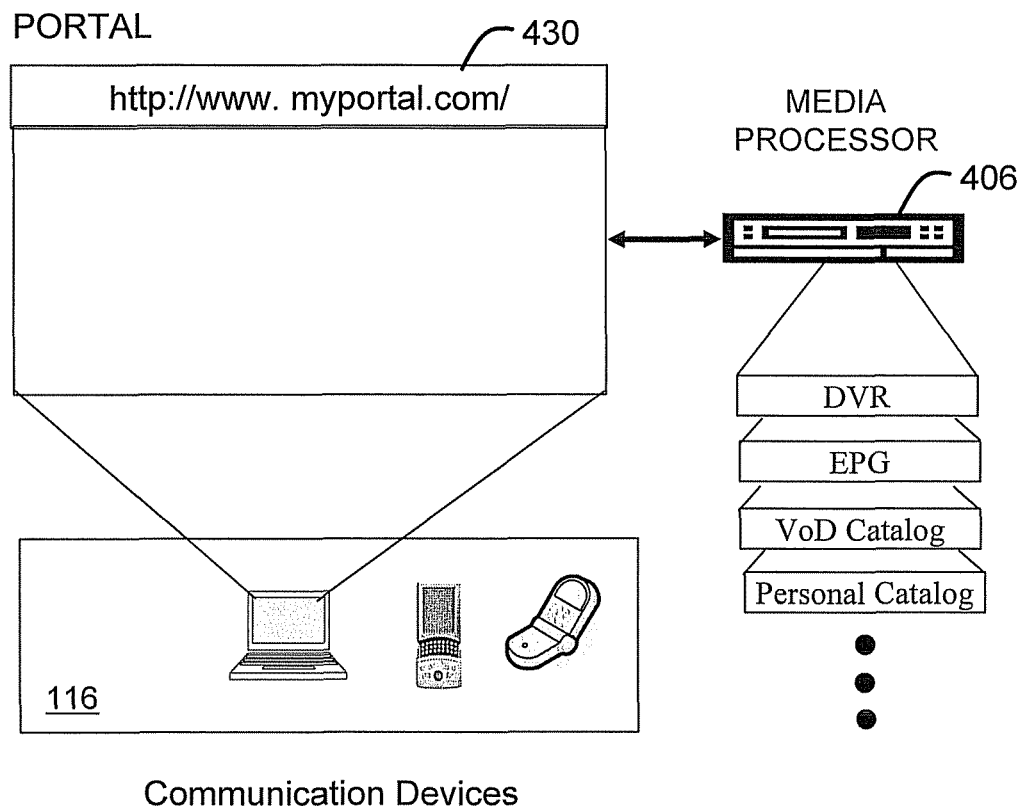
FIG. 4 depicts an illustrative embodiment of a portal interacting with at least one among the communication systems of FIGS. 1-3.

FIG. 4 depicts an illustrative embodiment of a portal 430. The portal 430 can be used for managing services of communication systems 100-300. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 406, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 5:
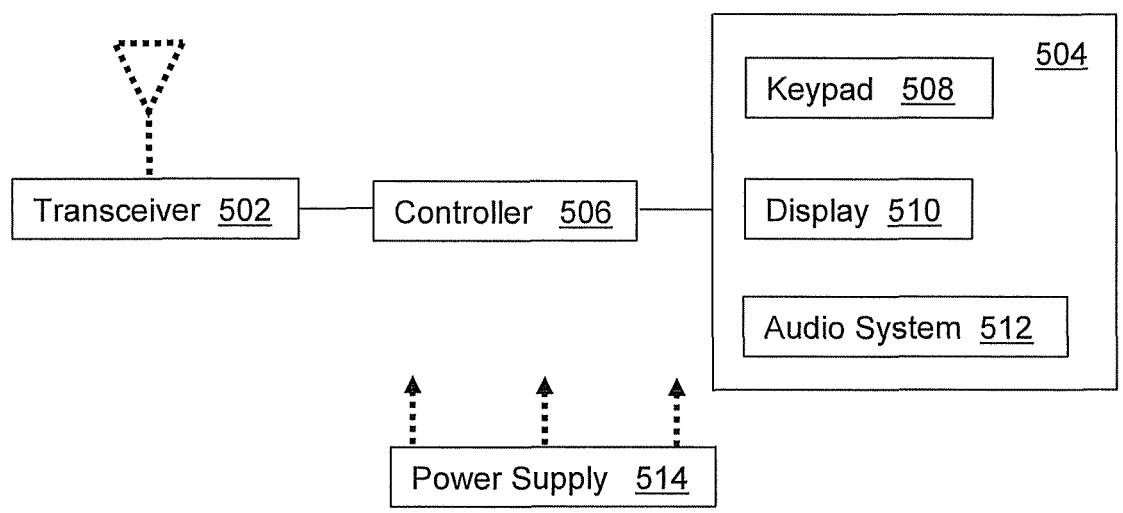
FIG. 5 depicts an illustrative embodiment of a communication device utilized in the communication systems of FIGS. 1-3.

FIG. 5 depicts an exemplary embodiment of a communication device 500. Communication device 500 can be a representative portion of any of the aforementioned communication devices of FIGS. 1-4. The communication device 504 can comprise a wireline and/or wireless transceiver 502 (herein transceiver 502), a user interface (UI) 504, a power supply 514, and a controller 506 for managing operations thereof. The transceiver 502 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WiMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 502 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 502 can also be adapted to support IP Multimedia Subsystem (IMS) protocol for interfacing to an IMS network that can combine PSTN and VoIP communication technologies.

The UI 504 can include a depressible or touch-sensitive keypad 508 and a navigation mechanism such as a roller ball, joystick, and/or navigation disk for manipulating operations of the communication device 500. The UI 504 can further include a display 510 such as monochrome or color LCD (Liquid Crystal Display), OLED (Organic Light Emitting Diode) or other suitable display technology for conveying images to the end user of the communication device 500. In an embodiment where the display 510 is touch-sensitive, a portion or all of the keypad 508 can be presented by way of the display. The UI 504 can also include an audio system 512 that utilizes common audio technology for conveying low volume audio (e.g., audio heard only in the proximity of a human ear) and high volume audio (e.g., speakerphone for hands free operation). The audio system 512 can further include a microphone for receiving audible signals of an end user.

The power supply 514 can utilize common power management technologies such as replaceable and rechargeable batteries, supply regulation technologies, and charging system technologies for supplying energy to the components of the communication device 500 to facilitate long-range or short-range portable applications. The controller 506 can utilize computing technologies such as a microprocessor and/or digital signal processor (DSP) with associated storage memory such a Flash, ROM, RAM, SRAM, DRAM or other storage technologies.

Figure 6:
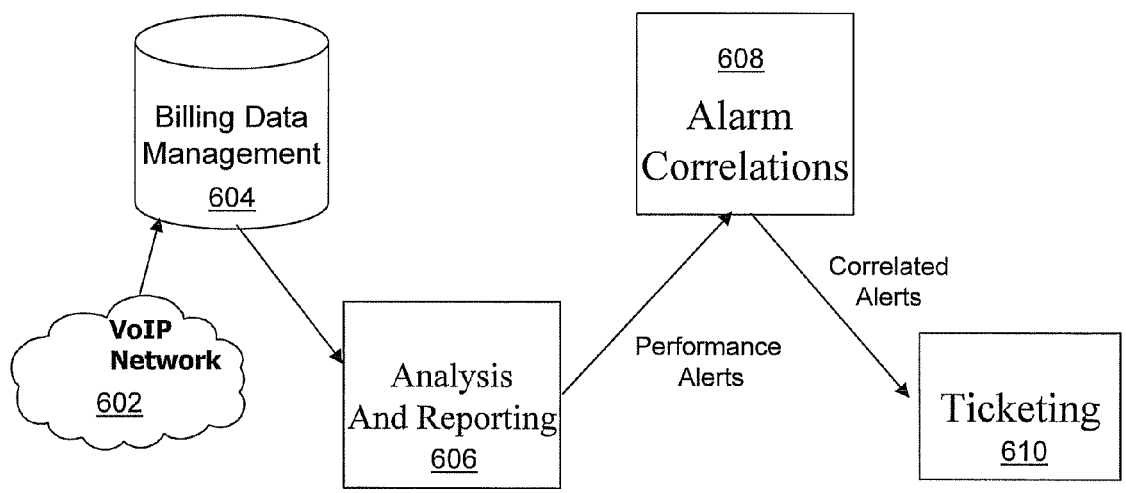
FIG. 6 depicts an illustrative embodiment of communication systems that provides media services.

FIG. 6 depicts an illustrative embodiment of a communication system 600 employing an VoIP architecture. Communication system 600 can be overlaid or operably coupled with communication systems 100-300 as another representative embodiment of said communication systems.

The communication system 600 can include a call record module 604 in communication with a VoIP network 602. In one embodiment, the call record module 604 can be a billing data management module for collecting billing information associated with communications occurring in the network 602. The billing information can be analyzed, such as by module 606 in order to determine call details or field information including the calling number, the called number and the nodes or other topology over which the communication is or has occurred. Other information can also be collected from the call detail records, such as a customer identification. In one embodiment, the call details can be collected or otherwise obtained at pre-determined intervals. An alarm module 608 can be used for determining undesired conditions associated with particular categories of priority or special services calls. Special service calls can be associated with a Public Safety Answering Point or a Public Service Access Point. In the United States of America (USA) special service calls can be associated with telephone numbers such as 911 or 710 calls. Other special service numbers may apply in other countries around the world. Accordingly, the present disclosure is intended to cover special services calls in any country. For illustrative purposes only, the present disclosure addresses special service calls in the USA.

In one embodiment, module 608 can correlate network traps with performance alerts to determine the undesired conditions. System 600 can include a ticketing module 610 in communication with alarm module 608 so that repair orders or other steps can be taken to provide proper priority to designated priority calls.

Figure 7:
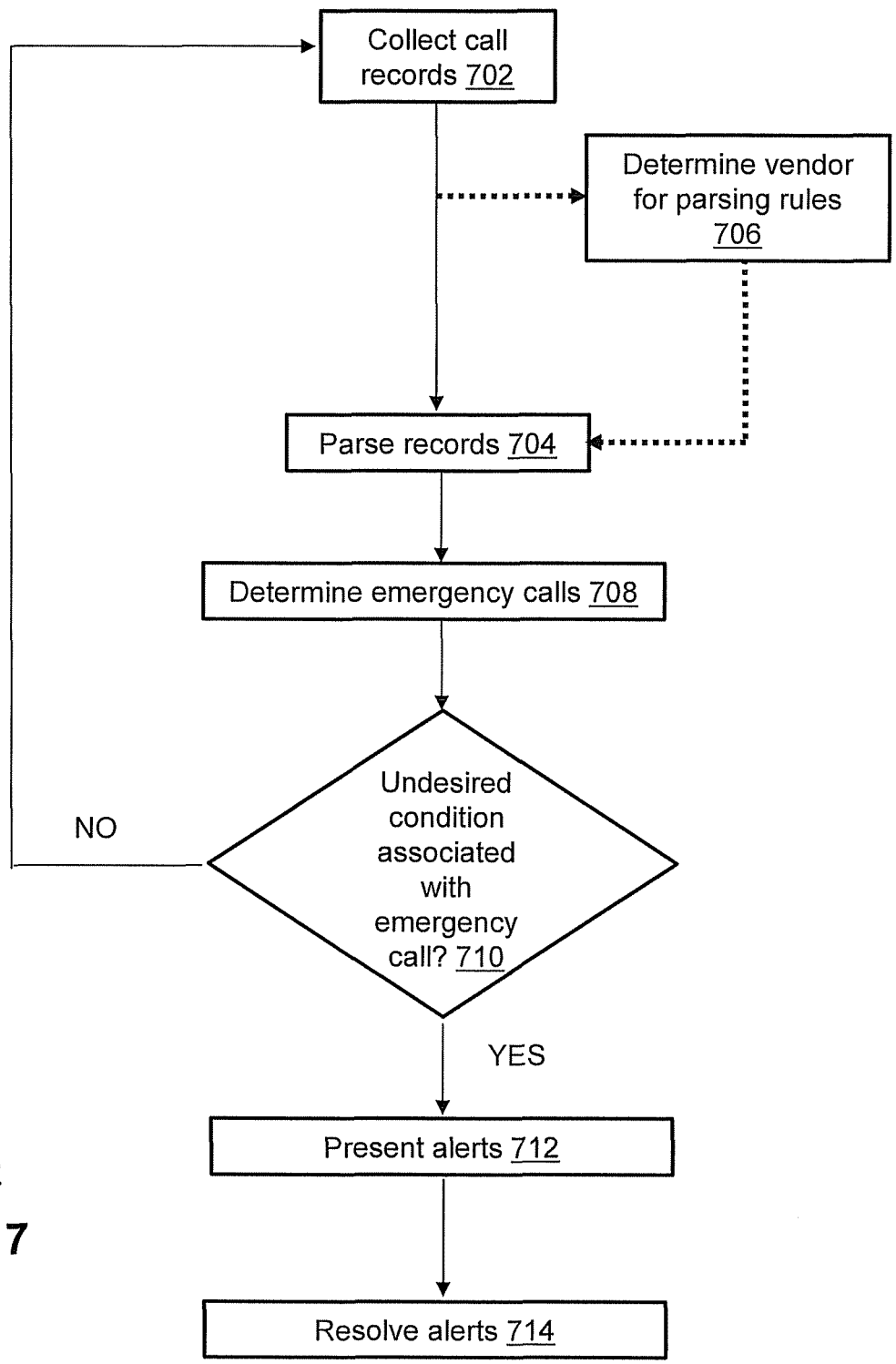
FIG. 7 depicts an illustrative embodiment of a method operating in portions of the communication systems of FIGS. 1-3 and 6.

FIG. 7 depicts an exemplary method 700 operating in portions of one or more of the communication systems 100-300 and 600. Method 700 has variants as depicted by the dashed lines. It would be apparent to an artisan with ordinary skill in the art that other embodiments not depicted in FIG. 7 are possible without departing from the scope of the claims described below.

Method 700 can begin with step 702 where module 604 collects call records or data for communications occurring over the VoIP network 602. The call records can include billing data associated with each of the VoIP communications. In one embodiment, the billing data can be in various formats, such as depending upon the billing entity or vendor generating or otherwise associated with the VoIP communication. In step 704, the call records can be parsed to determine information to be used for the monitoring of undesired conditions. The parsing can obtain various information, including calling numbers, called numbers, and network nodes (or geographic locations associated therewith) through which the calls are being made. In one embodiment in step 706, the parsing can be performed based on vendor or entity specific rules. For example, formats of the data specific to particular entities can be utilized for parsing the data.

In step 708, module 606 can determine or otherwise designate special service calls among the plurality of communications occurring over the VoIP network. For example, the parsed information can retrieve called numbers that utilize the 911 emergency telephone number or an Internet Protocol National Security and Emergency Preparedness telephone number. In step 710, the module 608 can determine if there is an undesired condition associated with a special service call. If an undesired condition exists for a special service call then method 700 can proceed to step 712 to present an alert based on the undesired condition, such as notification to a work center. If on the other hand, an undesired condition does not exist, then method 700 can return to step 702 to continue to collect call records.

The undesired conditions can include a blocked call, a cutoff call, a busy signal and/or a ring with no answer. In one embodiment, module 608 can monitor for a calling number placing a plurality of calls to a special services number. If the number of calls from the one calling number exceeds a threshold and the calls have not been successful (e.g., blocked, cutoff, busy, ring without answer) then module 608 can determine the existence of an undesired condition. In another embodiment, module 608 can monitor for a plurality of calling numbers placing calls to a special services number through one or more network nodes (e.g., a geographic location). If the number of calls from the calling numbers through the one or more network nodes exceeds a threshold and the calls have not been successful (e.g., blocked, cutoff, busy, ring without answer) then module 608 can determine the existence of an undesired condition. In one embodiment, the alerts presented in step 712 can be cleared if an undesired condition associated with the calling number or the network nodes is not determined from the next cycle of collection and analysis of call records.

In step 714, alerts associated with an undesired condition for a special services call can be resolved. For example, re-routing of calls through different nodes can be utilized, such as through nodes having less traffic. As another example, work or repair orders or tickets can be generated, such as by module 610, to address any equipment conditions or other issues that can be addressed by repair personnel or the like.

Upon reviewing the aforementioned embodiments, it would be evident to an artisan with ordinary skill in the art that said embodiments can be modified, reduced, or enhanced without departing from the scope and spirit of the claims described below. For example, the thresholds applied for determining the undesired condition can be adjusted based on a number of factors, including performance histories associated with a particular node. In other embodiments, absolute thresholds can be applied for determining certain types of undesired conditions, such as a ring without an answer.

In one embodiment, the collection of call records can be performed at adjustable time periods. For instance, shorter collection periods can be utilized for high traffic areas. In another embodiment, the collection of call records or data can be done according to scheduled transmissions of such data to the module 604. In yet another embodiment, a distributed data collection system can be utilized for gathering the information and parsing the records to obtain the information utilized by module 606 for determining an undesired condition.

Other suitable modifications can be applied to the present disclosure without departing from the scope of the claims below. Accordingly, the reader is directed to the claims section for a fuller understanding of the breadth and scope of the present disclosure.

FIG. 8 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a computer-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A tangible computer-readable storage device, comprising computer instructions, which, when executed, cause a machine to perform operations comprising:
   determining whether a portion of a plurality of calls over a voice over internet protocol network are to an emergency call center based on billing data;
   monitoring, for an undesired condition, the portion of the plurality of calls routed through a network node, the undesired condition comprising a quantity of blocked calls exceeding a threshold, the monitoring based at least in part on a geographic region associated with the network node; and
   presenting an alert when the undesired condition is detected.

2. The tangible computer-readable storage device of claim 1, wherein the operations further comprise parsing called numbers and network nodes associated with each of the plurality of calls.

3. The tangible computer-readable storage device of claim 1, wherein the undesired condition further comprises when at least one of a quantity of cutoff calls exceeds a first threshold, a quantity of busy signals exceeds a second threshold, or a quantity of unanswered calls comprising a ring without an answer exceeds a third threshold.

4. The tangible computer-readable storage device of claim 1, wherein the operations comprise determining a billing entity associated with the billing data and parsing the billing data based on parsing rules associated with the billing entity.

5. The tangible computer-readable storage medium device of claim 1, wherein the portion of the plurality of calls is associated with at least one of a telephone number associated with a public safety answering point or a public service access point, or an internet protocol national security and emergency preparedness number.

6. The tangible computer-readable storage device of claim 1, wherein the plurality of calls are from the same calling number.

7. A server comprising:
   a processor; and
   a memory comprising machine readable instructions that, when executed by the processor, cause the processor to perform operations comprising:
      monitoring a plurality of calls routed through a network node over a voice over internet protocol network to an emergency call center to detect unsuccessful calls made from one calling number, the monitoring based at least in part on a geographic region associated with the network node; and
      determining an undesired condition when a quantity of the unsuccessful calls made from the one calling number exceeds a threshold.

8. The server of claim 7, wherein the operations further comprise parsing call records to determine calling numbers and called numbers of the plurality of calls.

9. The server of claim 8, wherein the operations further comprise parsing the call records based on parsing rules associated with entities generating the call records.

10. The server of claim 9, wherein the call records comprise billing data.

11. The server of claim 7, wherein the operations further comprise presenting alerts based on a determined undesired condition.

12. The server of claim 7, wherein the unsuccessful calls include at least one of blocked calls, cutoff calls, busy signals or calls that ring without an answer.

13. A server comprising:
   a processor; and
   a memory comprising machine readable instructions that, when executed by the processor, cause the processor to perform operations comprising:
      monitoring a plurality of calls over a voice over internet protocol network to an emergency call center to detect unsuccessful calls made through one network node, the monitoring based at least in part on a geographic region associated with the one network node; and
      determining an undesired condition when a quantity of the unsuccessful calls made through the one network node exceeds a threshold.

14. The server of claim 13, wherein the operations further comprise parsing call records to determine network nodes through which the plurality of calls communicated.

15. The server of claim 13, wherein the operations further comprise parsing call records to determine calling numbers and called numbers of the plurality of calls.

16. The server of claim 15, wherein the call records comprise billing data, and wherein the operations further comprise parsing billing data based on parsing rules associated with entities generating the billing data.

17. The server of claim 13, wherein the operations further comprise adjusting the threshold.

18. The server of claim 13, wherein the operations further comprise presenting alerts based on a determined undesired condition.

19. The server of claim 13, wherein the unsuccessful calls include at least one of blocked calls, cutoff calls, busy signals or calls that ring without an answer.

20. A method comprising:
   monitoring, via a logic circuit, for unsuccessful calls to an emergency call center in a plurality of calls over a voice over internet protocol network, the unsuccessful calls being associated with at least one of one calling number and one network node, the monitoring based at least in part on a geographic region associated with the one network node; and
   determining, via the logic circuit, an undesired condition when a quantity of the unsuccessful calls made from the one calling number or through the one network node exceeds a threshold.

21. The method of claim 20, wherein the unsuccessful calls include at least one of blocked calls, cutoff calls, busy signals or calls that ring without an answer.

22. The method of claim 20, further comprising parsing billing data to determine at least one of network nodes through which the plurality of calls communicated, calling numbers of the plurality of calls and called numbers of the plurality of calls.

23. The method of claim 20, further comprising adjusting the threshold.

24. A method, comprising:
   monitoring, via a logic circuit, a portion of a plurality of calls over a voice over internet protocol network to an emergency call center for an undesired condition, the portion of the plurality of calls at least one of being from one calling number and being through one network node, the undesired condition comprising a quantity of blocked calls exceeding a threshold, the monitoring based at least in part on a geographic region associated with the one network node; and presenting an alert when the undesired condition is detected.

* * * * *